Nov. 23, 1965  R. W. CLOWERS  3,219,133
CRAWLER-TRACK AUTOMOTIVE VEHICLE
Filed March 18, 1963  3 Sheets-Sheet 1

INVENTOR.
Richard W. Clowers
BY
ATTORNEY

Nov. 23, 1965   R. W. CLOWERS   3,219,133
CRAWLER-TRACK AUTOMOTIVE VEHICLE
Filed March 18, 1963   3 Sheets-Sheet 3
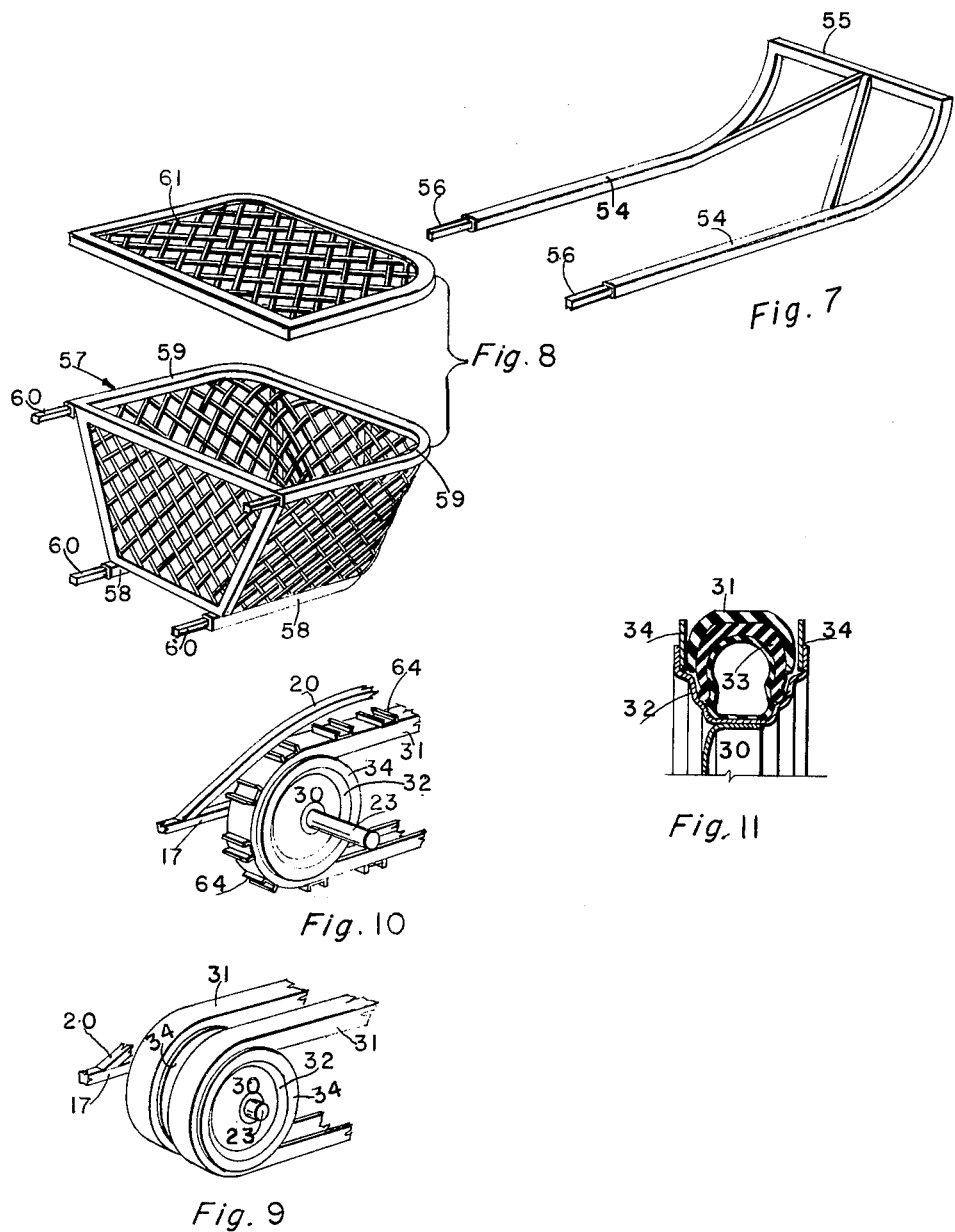
INVENTOR.
Richard W. Clowers.
BY
ATTORNEY.

United States Patent Office 3,219,133
Patented Nov. 23, 1965

3,219,133
CRAWLER-TRACK AUTOMOTIVE VEHICLE
Richard W. Clowers, near Denver, Colo.
(2742 S. Fenton St., Denver 27, Colo.)
Filed Mar. 18, 1963, Ser. No. 265,804
4 Claims. (Cl. 180—6.7)

This invention relates to automotive equipment regulably and dirigibly operable to transport an operator and supplemental variable load over substantially any and every type and condition of terrain surface with efficiency and economy, and more particularly to such equipment organized to effect its tractive propulsion through the agency of crawler tracks, and has as an object to provide a novel and improved tracked automotive vehicle of uniquely advantageous utility and practicality.

A further object of the invention is to provide a novel and improved crawler-track automotive vehicle that is capable by virtue of its distinctive organization of traversing steep slopes and surmounting many of the natural obstacles of primitive terrain with facility and security of operator safety.

A further object of the invention is to provide a novel and improved crawler-track automotive vehicle that is exceptionally maneuverable for travel along a selected, tortuous path through trackless regions.

A further object of the invention is to provide a novel and improved crawler-track automotive vehicle that is expedient of transport by conventional facilities to and from the areas of its intended use.

A further object of the invention is to provide a novel and improved crawler-track automotive vehicle that is amenable to wide variation of specific use adaptation.

A further object of the invention is to provide a novel and improved crawler-track automotive vehicle that is simple and convenient of operative regulation and control.

A further object of the invention is to provide a novel and improved crawler-track automotive vehicle that is susceptible of manipulation and operative control by an operator dismounted therefrom.

A further object of the invention is to provide a novel and improved crawler-track automotive vehicle that is feasible of economical production through ingenious correlation and operative combination of elements, components, and subcombinations themselves largely conventional and readily available.

A further object of the invention is to provide a novel and improved combination of coacting elements, features, and components in and to constitute a crawler-track automotive vehicle that is inexpensive of construction from commonly-available materials and supplies, that is rugged, sturdy, and operatively reliable in a compact organization of diverse specific adaptability, that is functionally flexible for accommodation to the exigencies encountered in diverse use environments, that is exempt from onerous servicing and maintenance requirements, and that is positive and efficient in attainment of the ends for which designed.

With the foregoing and other objects in view, my invention consists in the contruction, arrangement, and operative combination of elements as hereinafter set forth, pointed out in the appended claims, and illustrated by the accompanying drawings, in which:

FIGURE 7 is a perspective view of the skid frame unit detached from the association with the propulsive unit represented by FIGURES 1, 2 and 3.

FIGURE 8 is an exploded perspective view of a basket-type carrier adapted for detachable association with the propulsive unit in substitution for the analogous attachment represented by FIGURES 1 and 2.

FIGURE 9 is a fragmentary, detail view in perspective of a dual wheel and track arrangement expedient of optional use within the contemplation of the invention.

FIGURE 10 is a view similar to FIGURE 9 indicating the adaptability of the tracks characterizing the invention to coaction with traction-promoting adjuncts.

FIGURE 11 is a section, on a relatively enlarged scale, taken radially of a mounting wheel in engagement with a track member and substantially on the indicated line 11—11 of FIGURE 2.

Figure 1:
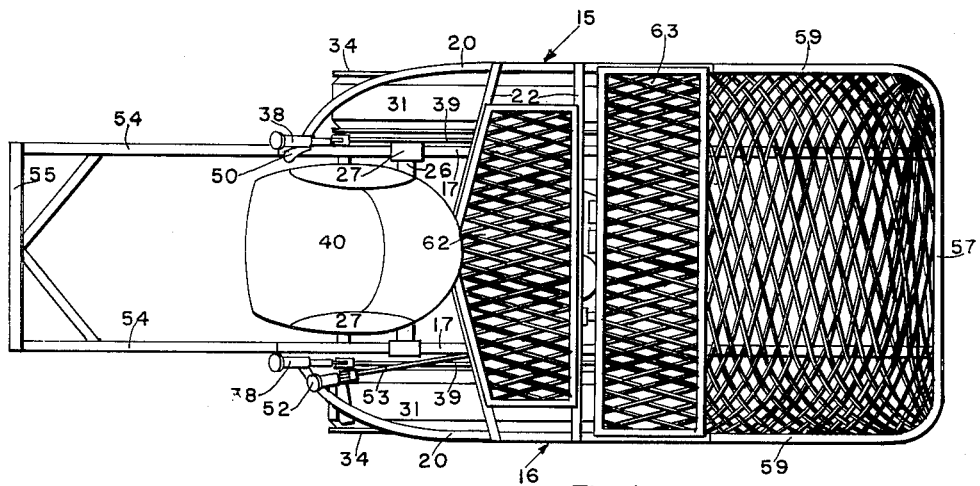
FIGURE 1 is a top plan view of a typical embodiment of the invention as organized ready for general practical use.

Occasions abound wherein, for various reasons and diverse specific purposes, powered transport of personnel and material is desired in situations and under conditions that preclude reliance upon conventional automotive equipment. Hunting, fishing, and other field sports, exploration, recreation, surveying, prospecting, construction, inspection and maintenance of power and fuel lines, rescue operations, and comparable activities are attended by and give rise to frequent need for an automotive vehicle capable of supplying powered transport away from roads and highways, through timber, over rugged terrain, and in insolated areas despite adversities of climate and weather, and the instant invention is hence directed to the provision of such a uniquely practical vehicle diversely employable as itself a means of recreation and amusement in addition to its utilitarian sufficiency.

Distinctively primary to the improved vehicle of the instant invention is a propulsion unit designated generally by the numeral 15. The elements, features, and components combined in and to operatively complete the unit 15 are cooperatively mounted upon and carried by a rigid, skeleton frame 16 contrived as may be expedient from light-weight, strong metal tubing, either round or angular in section, to rectangular plan form of maximum length slightly exceeding its maximum width and to size receivable for transport in the available compartment spaces of conventional automobiles. However assembled and braced as a rigid unit through interwelding of its constituent tubing members, a pair of like said members 17 is arranged in spaced parallelism longitudinally of the frame and intercoupled by a transverse member 18 inwardly adjacent the forward end of the frame spacedly paralleling a complementary transverse member 19 at the rearward end of the frame to define a horizontal lower deck plane, parallel to and above which an upper deck plane is established by members 20 laterally offset from and to overhang the members 17 in forward convergence to engagement therewith, said members 20 terminating rearwardly in substantial vertical registration with, above, and laterally offset from the corresponding ends of the members 17. Inwardly adjacent their rearward ends the members 20 are braced and intercoupled by a transverse member 21, and forwardly from the latter brace yokes 22 upstand from and bridge between the members 20 to establish a third deck plane parallel to and above those determined by the members 17 and 20, respectively.

The frame 16 is supported for translation on spacedly parallel front and rear axles 23 and 24, respectively, engaged beneath and transversely of the lower frame deck members 17. It is the function of the rear axle 24 to receive and transmit propulsive power, as hereinafter explained, to which end the said axle is journaled for rotation in and through bearings 25 fixed to and under the frame members 17 inwardly adjacent the intercoupling member 19, relative to which fixed attachment of the axle 24 to the frame 16 the axle 23 in adjustable longitudinally of the frame by virtue of a mounting shiftably engaged with the members 17, such as, for example, a sleeve 26 housing the axle 23 in fixed connection at its ends with and to span between sliders 27 reciprocably embracing said members subject to adjustable limitation of their displacement toward the axle 24 supplied by means of links 28 revolubly traversing the frame member 18 to threaded coaction of their inward ends with lugs 29 fixedly upstanding from the sleeve 26; said links 28 having shoulders bearing against the member 18 such as to limit and determine their axial extension inwardly of the member.

The opposite ends of the axles 23 and 24 operatively mount like wheels 30 thereon disposed in longitudinally spaced, coplanar relation at each side of the frame 16 outwardly adjacent the frame members 17 and beneath the lateral overhang of the frame established by the members 20. The wheels 30 associated with the axle 24 are suitably fixed thereto for rotation thereby and the wheels carried by the axle 23 engage therewith in any preferred manner appropriate to accommodate independent and unrestrained rotation thereof. In a unique adaptation of conventional components, the wheels 30 at each side of the frame 16 engage within a longitudinally extending endless, flexible loop 31 in a cooperation constituting and operatively completing a crawler track organization distinctively featuring the invention. As typified by FIGURE 11, the wheels 30 are of conventional construction characterized by the customary flanged rim 32 adapted to receive and mount a pneumatic tire 33 in an arrangement somewhat varied as to detail readily available in a considerable range of sizes. The loop 31 arranged over the wheels 30 to function as the propulsive tread of the crawler track may be, if desired, a specialized produced, but the provision for mounting the loop over, against, and partially about the convex exteriors of the wheel tires 33 makes feasible simple adaptation of a conventional pneumatic tire carcass of appropriate size to serve with economy and full satisfaction as the loop 31, since excision of the bead rings from the conventional tire carcass qualifies the latter, when of appropriate size, as an endless, transversely concavo-convex loop manipulable to span between the coplanar wheels 30 in engagement over and about the oppositely directed arcs of the wheel tires 33 with an effective, conforming coaction which applies the tread area of the conventional carcass to ground engagement under and between the wheels 30 coupled thereby. Security of loop coaction in guided relation with the wheel tires 33 is promoted through fixed attachment to the flanges of the conventional wheel rim 32 of annular plate extensions 34 applied concentrically of and to each side of the wheel as radial enlargements of the wheel flanges disposed to confine the curved end margins of the loop 31 opposed thereto. The adjustability of the forward axle 23 longitudinally of the frame members 17 in the manner and by the means hereinabove described contributes importantly to facilitate mounting, removal, replacement, and tension adjustment of the loops 31 relative to the wheels thereby embraced, since manipulation of the links 28 and consequent variation of their threaded coaction with the lugs 29 suffices in an obvious manner to shift the axle 23 toward and away from the axle 24 for any needful variation of the spacing therebetween.

Figure 5:
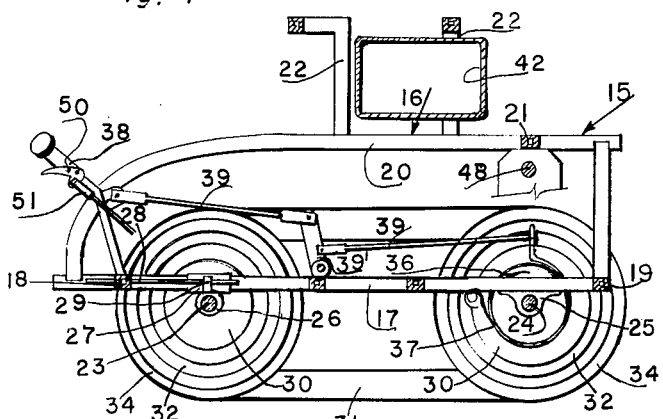
FIGURE 5 is a vertical sectional view taken longitudinall yof the propulsive unit substantially on the indicated line 5—5 of FIGURE 4 with components of the power train omitted and certain elements broken away for enhanced clarity of representation.
Figure 6:
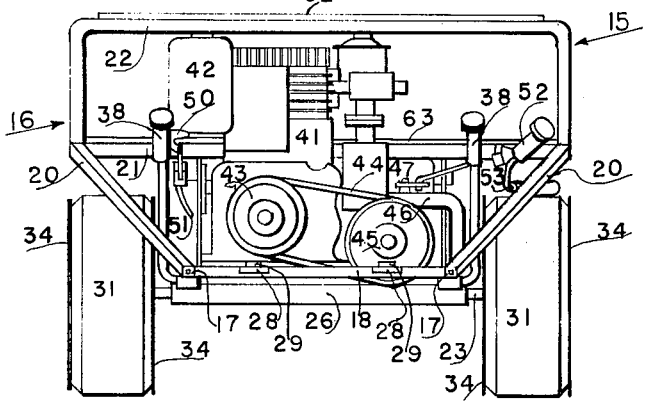
FIGURE 6 is a front end elevational view of the propulsion unit according to the showings of FIGURES 4 and 5.

Supplied to effect transmission of power to the wheels 30 therewith associated, as above noted, the axle 24 operates as is customary through a conventional differential 35 of appropriate type and construction to reflect power rotation of the differential as simultaneous and corresponding rotation of both of the associated wheels 30 with accommodation of maintained drive to either one of said wheels when the other thereof is restrained from rotating, whereby directional control of propulsive unit travel may be had through selective braking of the wheels powered by the axle 24 for consequent and corresponding regulation of the tractive influences applied by the track-constituting loops 31 respectively actuable thereby. Selective braking of the wheels 30 served by the axle 24 for consequent directional control of unit travel may be had through any preferred arrangement of means expedient of optional manipulation by an operator such as, for example, that illustrated and best shown in FIGURE 5 of the drawings wherein 36 designates a conventional brake drum affixed in the usual manner to and for rotation with each of the wheels served by the axle 24 within and for frictional reaction to a constrictable band 37 attached at one end to the frame 16, 38 identifies a hand lever hinged at its lower end to a frame member 17 adjacent the conjunction of the member 18 therewith to swing in a vertical arc above and parallel to the said member 17 in a duplicate arrangement at both sides of the frame 16, and 39 denotes a linkage, including a rock arm 28′, intercoupling each said hand lever 38 and the band 37 at the same side of the frame in a manner to apply displacement of the lever forwardly of the frame for constriction, with enhanced leverage, of the band into braking coaction with the associated drum 36. The arrangement illustrated and just described disposes the duplicate hand levers 38 to upstand in spaced relation from their hinge connections with the members 17 at the forward end of the propulsive unit and at the opposite sides of a location suited to receive an operator's seat 40 adapted for support in detachable association with the frame member 18 and forward frame yoke 22 in a disposition such as to face an occupant forwardly of the unit, whereby to correlate the steering levers 38 and the operator's position in a manner to promote natural and convenient manipulation of the levers for desired steering effect, it being manifest that normal retraction of the levers under the influence of the bands 37, or equivalent agencies, frees the wheels controlled by the bands for unimpeded rotation with the axle 24 productive of unit travel in a straight line as the track-constituting loops 31 are driven by the wheels, and that a rocking of either of the levers 38 forwardly with respect to the unit acts through the associated linkage 39 to constrict the band 37 at the same side of the unit into a braking coaction with its drum proportional to the pressure applied to the lever and effective to retard, or stop, travel promoting actuation of the wheel 30 and loop 31 subject to control thereby while drive of the wheel 30 and loop 31 at the oppoiste side of the unit continues to effect consequent deviation of unit travel toward the side whereto the braking influence is applied. Dirigible by the means and in the manner described, the propulsive unit may be turned in either direction and to any desired degree through arcs of exceedingly short radius.

Power to drive the axle 24 is supplied by a conventional internal combustion engine 41, or the equivalent, of a size and capability suited to its purposes which, in association with its fuel supply 42, is secured to the deck of the frame 16 determined by the members 17 beneath the brace yokes 22 and hence approximately at the midlength of the propulsive unit, whereby to impose the weight of the engine, fuel supply, and most components of the power train hereinafter to be described between the axles 23 and 24 and within the span separating the track-constituting loops 31 where it applies with stabilizing effect on the attitude of the propulsive unit during travel thereof, particularly when negotiating slopes and inclines, and tractively loads the loops 31 for efficient reaction under power, all in accordance with and to realize certain principles featuring the invention. The power train wherethrough output of the engine 41 is delivered and operatively applied to rotate the axle 24 is essentially conventional in any appropriate preferred arrangement and operative correlation of requisite instrumentalities, and is but typically exemplified by the particular organization thereof represented by certain views of the drawings. As illustrated, power output of the engine 41 is delivered through a centrifugal clutch 43, belt drive 44, and torque converter 45 to a change gear 46 in driving relation through a speed reducer 47 with a jackshaft 48 superjacently paralleling the axle 24 and mounting a pinion connected by means of a chain 49 with and to drive the differential 35 of said axle, whereby, as is known practice, to power the wheels 30 carried by the axle in reaction to the regulable operation of the engine 41 and selective adjustment of the change gear 46. Conventionally, the engine 41 is equipped with a throttle adjustable to regulate the speed of engine operation and the centrifugal clutch 43 functions automatically to interrupt the power train served by the engine at idling speeds of the latter and to operatively complete the power train at higher engine speeds, thereby qualifying the throttle for control of the clutch feature as well as, and in reaction to, control of engine speed. Thus, full operating control of the propulsive unit at any and every setting of the change gear 46 feasibly is made available to an operator occupying the seat 40 through provision of a throttle lever 50 articulated to the steering lever 38 at the right-hand side of said seat in connection through a suitable linkage 51 with the engine throttle, whereby, as is obvious, actuation of the lever 50 by the hand of the operator grasping the associated steering lever may apply, alternatively, to idle the engine with accompanying disengagement of the clutch included in the power train and to increase engine speed promptly reflected by engagement of the clutch and delivery of propulsive power as desired within the capability of the engine. Selective actuation of the change gear 46 is the function of a hand lever 52 hinged to the frame 16 adjacent the steering lever 38 at the left-hand side of the seat 40 conveniently within the reach of an operator in connection through a linkage 53 with the shift lever of the change gear, whereby selection of a desired gear ratio available through the change gear may be made by the left hand of an operator while the right hand retains control of the engine and associated clutch by way of the throttle lever 50, it being apparent that adjustment of the change gear through the agency of the lever 52 is had only when the clutch is disengaged and the propulsive power train is interrupted to obviate occasion for coincident steering of the unit by means of the levers 38.

Tracked, propulsively self-powered, and dirigible as set forth, the unit thus far described is a compact automotive unit of light weight desirably, although not necessarily, sized to be accommodated for transport in conventional automobile compartments and capable of self translation over unimproved terrains and through primitive environments in response to manipulations feasible of application by an operator accompanying the vehicle on foot, the stability inherent in the vehicle resulting from correlation of power plant and power train weights with the axles and tracks as above described assuring maximum operative utility of the vehicle free from tendency to flip and careen while negotiating slopes and obstacles, and the arrangement of controls hereinbefore set forth serving to facilitate convenient regulation and control of vehicle operation by a non-riding escort.

Operatively complete as an automotive vehicle, the propulsion unit 15 is amenable to diverse use adaptations through interchangeable association therewith of various supplements and attachments employable in consequence of the propulsive unit organization without impairment of the capabilities of the latter to enhance the practicality and to realize the many specific purposes of the unit. Conditioned through provision of the seat 40 to be ridden by an operator when situations permit, the propulsion unit 15 desirably is supplemented for practical accommodation of a rider by a skid frame comprised from spaced, parallel, like side bars 54 bowed upwardly at their outer ends and rigidly interbraced in secure attachment to a transverse terminal bar 55 conjoining said ends. In a lateral spacing corresponding with that of the frame members 17 of the unit 15, the bars 54 are formed at their ends remote from the bar 55 as bolts 56 outstanding in alignment therefrom and relatively reduced size suited for reception within the open ends of the tubular members 17, whereby telescopic engagement of the bolts 56 within the ends of the members 17 adjacent the position of the seat 40 serves to connect the skid frame to and for support by the frame 16 of the unit 15 with the bars 54 extending as aligned continuations of the members 17 outwardly and away from the seat 40 to dispose the terminal bar 55 of the skid frame parallel to and well in advance of the unit axles 23 and 24 where it is suited to function as a footrest available to a seated operator in an elevation above the bars 54. In appropriate length and conformation, the bolts 56 coact in engagement with the ends of the members 17 to support the skid frame in projection forwardly from the unit 15 above and in clearing relation with the unit support plane, in which coaction said bolts are separably latched by any expedient means, not shown, against inadvertent release from the said members, there being, as is well known, many types and forms of latches and fasteners applicable to effect detachable conjunction of the bolts 56 and members 17. In addition to providing a footrest for a seated operator of the unit 15, the skid frame functions in attachment to the unit to minimize and limit forward tilting of the assembly during transit, since any tendency of the added weight of a seated operator to promote forward tilting of the unit 15 is countered, when present and effective, by the forward reach of the bars 54 wherethrough the upwardly bowed ends of the bars are deflected to ground engagement with a skidding reaction which limits and determines forward tilt of the unit. Conversely, the skid frame assists passage of the unit over obstacles and obstructions against which the upwardly bowed ends of the bars 54 may be brought to bear, since in such a condition forward travel of the unit acts through the skid frame to slide the bars 54 upwardly on and over the obstruction or obstacle with an initial rearward tilt of the assembly helpful to its tractive passage thereover. Useful in association with the propulsive unit 15 as just explained, the skid frame is available to a dismounted operator as a lever manipulable by means of its terminal bar 55 to assist and to direct powered progress of the unit as occasion may require. The skid frame attachment shown and described is but exemplary of a group of structurally diverse, functionally specific adjuncts alike suited for alternative connection to the unit 15 in substitution for the skid frame for attainment of their intended purposes in a supplementing interchangeable coaction with the unit the same as that of the skid frame.

Figure 2:
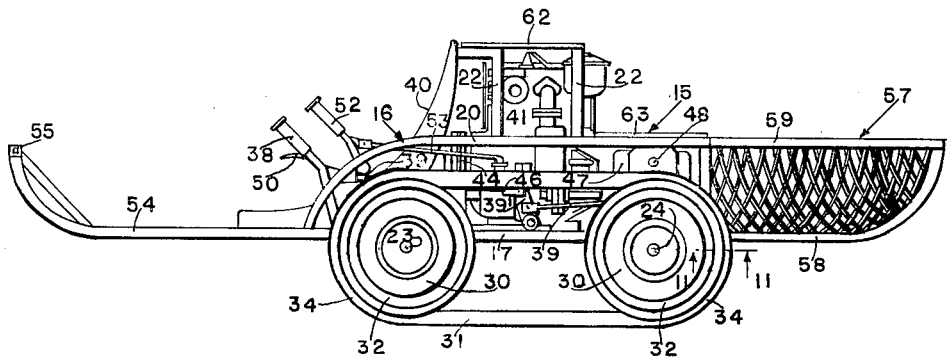
FIGURE 2 is a side elevational view of the arrangement according to FIGURE 1.
Figure 3:
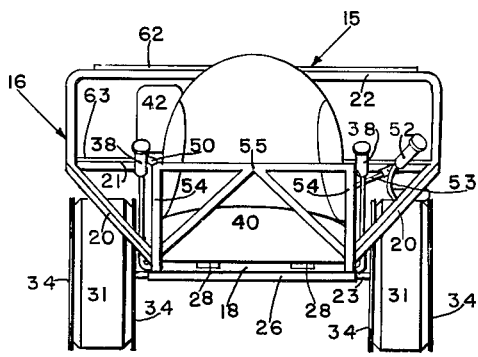
FIGURE 3 is a front end elevational view of the arrangement according to FIGURES 1 and 2.
Figure 4:
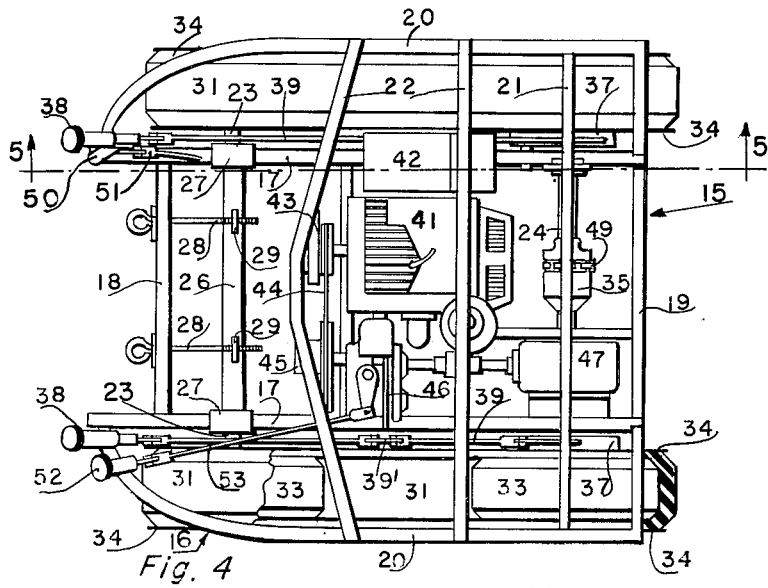
FIGURE 4 is a top plan view of the powered, propulsive unit of the arrangement according to the preceding views as separated from detachable complements shown in the latter and with certain components broken away to show a track member in section.

The utility and versatility of the automotive vehicle characterized by the propulsive unit 15 are enhanced in accordance with the principles of the invention through adaptation to mounted association with the propulsive unit 15 of carrier frame attachments such as are typically represented in FIGURES 1, 2 and 8 under the general designation 57. Susceptible of diverse specific construction and organization in adaptations suited for particular purposes, such as accommodation of passengers, equipment, tools, supplies, and the like, the carrier frame attachments 57 employable as supplements to the propulsion unit 15 are alike characterized by rigidly-interrelated members 58 and 59 arranged to abuttingly register at their ends with the ends of the members 17 and 20, respectively, rearwardly terminating the frame 16. In analogy with the described means for detachably engaging the skid frame in supported relation with the propulsion unit, ends of the carrier frame members 58 and 59 disposed for registered abutment against rearward ends of the members 17 and 20 of the frame 16 are formed as coaligned bolts 60 slidably receivable within the open ends of the tubular members 17 and 20 for detachable interlock, as by means of suitable fasteners or latches, therewith, whereby any preferred carrier frame attachment, such as the basket type closable by a cover 61 represented by FIGURE 8, may be interchangeably mounted in supported relation on the end of the frame 16 remote from the position of the skid frame for translation with the propulsion unit 15 above and in clearing relation with the support plane of said unit. Inherent in the correlation of skid frame, operator's station, and carrier frame attachments with the propulsion unit 15 distinguishing the automotive vehicle of the invention is a consequent balancing of imposed loads fore-and-aft of the propulsion unit which promotes stability of the assembly in operation and efficient application of its tractive output.

The multideck form of the frame 16 hereinabove described expediently qualifies the propulsion unit 15 to receive and transport imposed loads, passenger or other, independently of a carrier frame attachment, since it is both feasible and desirable to apply a transom 62 in secure covering relation with the upper frame deck established by the horizontal components of the brace yokes 22 where it may serve as a horizontal seat or platform for the support of loads, and to similarly apply a transom 63 to the second, or intermediate, deck of the frame in attachment to rearward portions of the members 20 and overlying relation with the unit axle 24 where it serves as does the transom 62 in parallel, offset correlation therewith.

FIGURE 9 evidences that it is within the contemplation of the invention to provide dual wheels 30 at each end of the axles 23 and 24 in operative association with dual track-constituting endless loops 31 whereby, when appropriate, to enlarge as may be desired the tread area available for support and translation of the propulsion unit 15 and its attachments, while in FIGURE 10 it is shown to be within the contemplation of the invention that the track-constituting loops 31, in whatever number or arrangement provided, may be equipped with cleats, lugs, or other traction-promoting facilities 64 attached in spaced succession to the tread faces of the loops wherewith they function for obvious effect.

Adapted through convenient separation of skid frame and carrier frame attachments from the compact, operatively-complete propulsion unit 15 for transportation in conventional vehicles to and from the areas of its use, the automotive vehicle of the invention is an efficient and versatile self-powered facility susceptible of ready adaptation to diverse practical uses with unique capability and manifest advantage.

Since changes, variations, and modifications in the form, construction, and arrangement of the elements shown and described may be made without departing from the spirit of my invention, I wish to be understood as being limited solely by the scope of the appended claims, rather than by any details of the illustrative showing and foregoing description.

I claim as my invention:

1. A crawler-track automotive vehicle comprising a rigid frame including a pair of spaced, longitudinally extending lower side members having front and rear ends and means transversely interconnecting said lower side members to define therewith a horizontal lower deck plane, a pair of spaced, upper side members secured in converging relationship with at least one of said ends of said lower side members and extending upwardly and outwardly therefrom into laterally offset horizontally and vertically spaced parallelism therewith, means transversely interconnecting said upper side members to define therewith an upper horizontal deck plane, seat means carried by said frame in vertically spaced juxtaposition to said one end of said lower side members, a pair of transversely extending front and rear axles rotatably carried by said lower side members in spaced relationship to the front and rear ends of the same, respectively, wheels operatively supporting each of said axles outwardly of said lower side members and inwardly of said upper side members, the wheels engaged with the separate axles on the same side of the frame being coplanar, endless track-constituting loops operatively tensioned about and between each pair of coplanar wheels, power supply means carried by said frame between said axles, driving means operatively interconnecting said power supply means with one of said axles to drive the wheels associated therewith, drive control lever means operatively connected to said driving means and selectively manipulable to regulate the operative relationship between said power supply means and said one axle, separate brake means operatively associated with each of the driven wheels, and separate brake control lever means operatively connected to each of said brake means and selectively manipulable to engage and disengage the same for steering the vehicle, said drive control lever means and said separate brake control lever means each having portions extending in juxtaposition to said seat means and also in juxtaposition to said one end of said lower side members whereby all of said control lever means may be manipulated both by an operator carried by seat means and by an operator walking with said vehicle.

2. The organization according to claim 1, wherein said power supply means includes an internal combustion engine having a throttle, said driving means including a centrifugal clutch operatively connected to said engine, a change gear operatively connected to said clutch and having a shift means, and a transmission operatively interconnecting said change gear and said one axle, said drive control lever means including a throttle lever operatively connected to said throttle of said engine and articulately supported in juxtaposition to said one end of one of said lower side members, and a change gear lever operatively connected to said shift means of said change gear and articulately supported in juxtaposition to said one end of the other of said lower side members.

3. The organization according to claim 1 wherein said one axle is fixedly secured to a portion of said frame against relative displacement, slider means securing the other of said axles to said frame in shiftable relationship thereto, and adjustable means interconnecting said frame and said slider means to selectively vary the distance between said axles for maintaining proper tension on said track-constituting loops.

4. An organization according to claim 1, wherein said wheels each include a substantially U-shaped flanged wheel rim and a transversely crowned pneumatic tire carried by said rim between the flanges of the same, said track-constituting loops conforming substantially to the shape of the transverse crown of said tires and extending in flexible engagement over the tires on each of said pairs of coplanar wheels and having portions engaged between the sides of said tires and the flanges of said rims.

References Cited by the Examiner

UNITED STATES PATENTS

| | | | |
|---|---|---|---|
| 1,358,575 | 11/1920 | Rimailho | 180—9.32 |
| 1,932,108 | 10/1933 | Johnston et al. | 180—6.7 |
| 2,031,303 | 2/1936 | Eberhard | 180—9.2 |
| 2,149,278 | 3/1939 | Christmas | 301—39 |
| 2,321,874 | 6/1943 | Tandler et al. | 180—6.7 |
| 2,698,667 | 1/1955 | Kropp | 180—6.7 X |
| 2,788,076 | 4/1957 | Whaley | 180—6.7 |
| 2,875,839 | 3/1959 | Spinks | 180—9.24 X |
| 2,886,934 | 5/1959 | Jepson | 180—19 |
| 3,105,536 | 10/1963 | Cappa | 305—35 X |

A. HARRY LEVY, *Primary Examiner.*

PHILIP ARNOLD, *Examiner.*